United States Patent
Hsieh

[11] Patent Number: 6,147,464
[45] Date of Patent: Nov. 14, 2000

[54] METHOD AND DEVICE FOR COMPENSATING THE HORIZONTAL SCANNING SIZE

[75] Inventor: Chang-Fa Hsieh, Taipei Hsien, Taiwan

[73] Assignee: Acer Peripherals, Inc., Taiwan

[21] Appl. No.: 09/090,870

[22] Filed: Jun. 5, 1998

[30] Foreign Application Priority Data

Jan. 26, 1998 [TW] Taiwan ................................. 87101135

[51] Int. Cl.⁷ .............................. H01J 29/70; H01J 29/56; G09G 1/04
[52] U.S. Cl. ........................... 315/411; 315/408; 315/370
[58] Field of Search ................................... 315/411, 408, 315/370, 369, 399

[56] References Cited

U.S. PATENT DOCUMENTS

| | | | |
|---|---|---|---|
| 4,335,335 | 6/1982 | Willis | 315/411 |
| 5,276,604 | 1/1994 | Messman | 363/65 |
| 5,648,704 | 7/1997 | Krause | 315/408 |
| 5,990,940 | 11/1999 | Hashimoto et al. | 348/184 |

*Primary Examiner*—Seungsook Ham
*Assistant Examiner*—John Patti
*Attorney, Agent, or Firm*—Pillsbury Madison & Sutro LLP

[57] ABSTRACT

A compensation control circuit of horizontal scanning size suitable to be used in a general monitor to compensate the variation amount of horizontal scanning size due to the influence of the anode load current. The compensation control circuit includes two parts: One is the horizontal scanning size compensation circuit and the other is the horizontal scanning size control circuit. The horizontal scanning size compensation circuit is coupled to the coil of the fly-back transformer to generate a corresponding compensation signal according to the variation of the anode load current. The compensation signal is far lower than the level of the anode voltage. Therefore, it can be processed by the general electric circuits. The horizontal scanning size control circuit is coupled to the horizontal scanning size compensation circuit to receive the compensation signal. The compensation signal can combine with the shift regulation signal sent by the microprocessor to be a D.C. modulation signal. Then the D.C. modulation signal combines with the A.C. modulation signal to generate the modulation voltage. Because the modulation voltage of the another terminal of the horizontal deflection yoke contains the D.C. compensation signal factor, the modulation voltage will compensate the influence of the horizontal scanning size due to the variation of the anode voltage when the anode load current changes.

12 Claims, 2 Drawing Sheets

METHOD AND DEVICE FOR COMPENSATING THE HORIZONTAL SCANNING SIZE

BACKGROUND OF THE INVENTION

1. Field of the Invention

The present invention in general relates to a compensation control circuit of horizontal scanning size(H-size) for a monitor, more specifically, to a compensation control circuit and compensation method for compensating the variation of the horizontal scanning size due to the change in anode voltage of a picture tube when adjusting the luminance of the frame.

2. Description of the Prior Art

A cathode ray tube monitor(hereafter "CRT monitor") is a common monitor apparatus such as monochrome/color televisions or monochrome/color computer monitors etc. The CRT monitor is composed of cathode ray tube (CRT) and its peripheral processing circuit. The axiom of the CRT is mainly making use of electron beam to hit the fluorescent materials to fluoresce. The peripheral circuit is applied for controlling the path and the speed of the electron beam. FIG. 1 (Prior art) shows the cross-sectional view of a general CRT. Referring to FIG. 1, a CRT is mainly composed of the front section (including: filament 10, cathode 12, grid 14, anode 16, and deflection yoke 18) used to generate and accelerate the electron beam, the middle section (including: cavity 20 and anode button 22) used to deflect and accelerate the electron beam, and the faceplate section (including: aluminum membrane 30, fluorescence membrane 32, and screen glass 34) used to actually fluoresce. The filament 10 is heated by the current to generate the thermal electrons which are shot from the cathode 12. The thermal electrons shot from the cathode 12 form the focusing electron beam 40 through the focusing effect of the grid. The anode 16 draws electron beam 40 to accelerate by the electrode characteristic. In actual applications, the anode in the CRT is mostly composed of a plurality of anode electrodes. And the voltage could be many thousand volts to many ten thousand volts. On the other hand, the deflection yoke 18 guides the electron beam 40 to change its moving direction by the electromagnetic characteristic. In actual applications, the deflection yoke is provided with two groups: horizontal deflection yoke(H-DY), and vertical deflection yoke(V-DY). These two groups of deflection yokes will respectively control the horizontal and the vertical direction of the movement of the electron beam according to the horizontal scanning control signal and the vertical scanning control signal. The electron beam 40 accelerated and deflected to a predetermined angle go on a rectilinear motion in the cavity 20 of the CRT, until landing the fluorescence membrane 22 of the faceplate to fluoresce. During advancing in the cavity 20, the electron beam is still drawn by the anode high voltage 22 to accelerate.

In the ideal CRT picture tube, the horizontal size of the showing screen is controlled by the corresponding horizontal deflection yoke. As FIG. 1 shows, the horizontal yoke 18 in the neck portion of the CRT controls the range of the deflection angle within the neck portion by its magnetic field intensity. Then, the electron beam 40 leaves the neck portion in a predetermined angle and goes on to accelerate directly. That is, in the ideal condition, the deflection angle of the electron beam 40 can be determined by the magnetic field intensity generated by the horizontal yoke 18. But in the actual applications, if the anode voltage changes, the deflection angle θ will change also.

When the electron beam 40 goes into the neck portion controlled by the deflection yoke 18, it is influenced by the magnetic field(its direction is outward the paper or inward the paper) generated by the deflection yoke 18, and pushed by the magnetic force $F_m = qv \times B$ to shift in the deflection direction, wherein q denotes the charge, v denotes speed of the motion, and B the denotes the magnetic field generated by the deflection yoke. Besides, the deflection angle θ is basically determined by the horizontal shift position of the electron beam 40 due to the variation of the magnetic field in the neck portion. How the anode voltage influences the deflection angle θ of the electron beam 40 will be illustrated briefly as follows according to the above phenomenon.

When the anode voltage increases, it means the electron beam 40 is accelerated by the stronger magnetic field. Then when the electron beam 40 enters the neck portion controlled by the deflection yoke 18, the passing time becomes shorter because the speed is faster than that in the normal condition. Then the horizontal shift position due to the magnetic field B becomes smaller, that is, the deflection angle becomes smaller. Therefore, the range of the landing area in the screen becomes narrower, that is to say, the horizontal scanning size will be smaller than that in the normal condition. On the other hand, when the anode voltage decreases, the speed of the electron beam 40 becomes slower accordingly. Consequently, as the deflection angle θ becomes larger, the horizontal scanning size becomes larger than that in the normal condition. The relationship between the horizontal scanning size and the anode voltage described above can be verified by the motion model of the electron beam, and will not be further described here. According to the above description, the horizontal scanning size is inversely proportional to the anode voltage.

In the normal condition, the anode voltage maintains stable and will not be drifted. But in some practical conditions, the anode voltage is indeed changed by the parameters of the other circuits, resulting in the instability of the horizontal scanning size. For example, while tuning the luminance of the frame, the anode high voltage changes due to the change in the load condition.

The method of the prior art to solve the problem is to stabilize the voltage directly. For example, there is voltage stabilizing circuit dealing with high voltage in the general TV to keep the stability of the high voltage. But the cost of the high voltage stabilizing circuit is very expensive, not all the monitors will adopt the design. This is one of the disadvantages of the prior art. Hence, the present invention provides an effect and economic method to solve the problem described above.

SUMMARY OF THE INVENTION

Accordingly, an object of the present invention is to provide a compensation control circuit of horizontal scanning size and its compensation method to compensate the variation of the horizontal scanning size due to the change in anode voltage in less expensive way, thus improving the quality of the frame of the CRT monitor.

The present invention achieves the above object by providing a compensation control circuit of horizontal scanning size suitable for being used in a monitor to compensate the variation of the horizontal scanning size due to the anode voltage. In this monitor, the anode voltage is generated by a specific coil of the fly-back transformer(FBT). One terminal of the specific coil outputs the anode voltage, the other terminal connected to the compensation control circuit. Besides, the horizontal scanning size of the monitor is controlled by the horizontal deflection yoke. One terminal of the horizontal deflection yoke receives the horizontal scanning control signal and the other terminal receives a modulation signal to compensate the size of the horizontal scanning size and geometric distortion. The compensation control circuit includes two parts, one is the horizontal scanning size compensation circuit and the other is horizontal scanning size control circuit. The horizontal scanning size compensation circuit is coupled to the other terminal of the fly-back transformer, to generate the corresponding compensation signal according to the change of the anode load current. The compensation signal is far lower than the level of the anode voltage, thus it can be processed by the general electric circuits. The horizontal scanning size control circuit is coupled to the horizontal scanning size compensation circuit to receive the compensation signal. In the embodiment of the present invention, the compensation signal and the shift regulation signal sent by the microprocessor can be synthesized to be a D.C. (direct current) modulation signal, which is merged with the A.C. (alternating current) modulation signal to be sent to the bipolar modulator to generate the modulation voltage. Because the modulation voltage of the other terminal of the horizontal deflection yoke includes the D.C. compensation signal factor, the modulation voltage can compensate the variation of the horizontal scanning size when the anode voltage variates due to the change of the anode load current.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

The horizontal scanning size compensation control circuit of the present invention deals with the influence of the variation of the anode voltage in the way of compensation, not in the way of directly stabilizing the anode high voltage. As described above, when the luminance of the monitor changes, it will cause the variation of the anode load current. Thus the anode voltage changes and the size of the horizontal scanning size is variated. When the luminance of the monitor increases, the anode load current increases and the anode voltage decreases causing the horizontal scanning size to increase. When the luminance of the monitor decreases, the anode load current decreases and the anode voltage increases causing the horizontal scanning size to decrease. The present invention will by illustrated with a preferred embodiment in the following.

Figure 1:
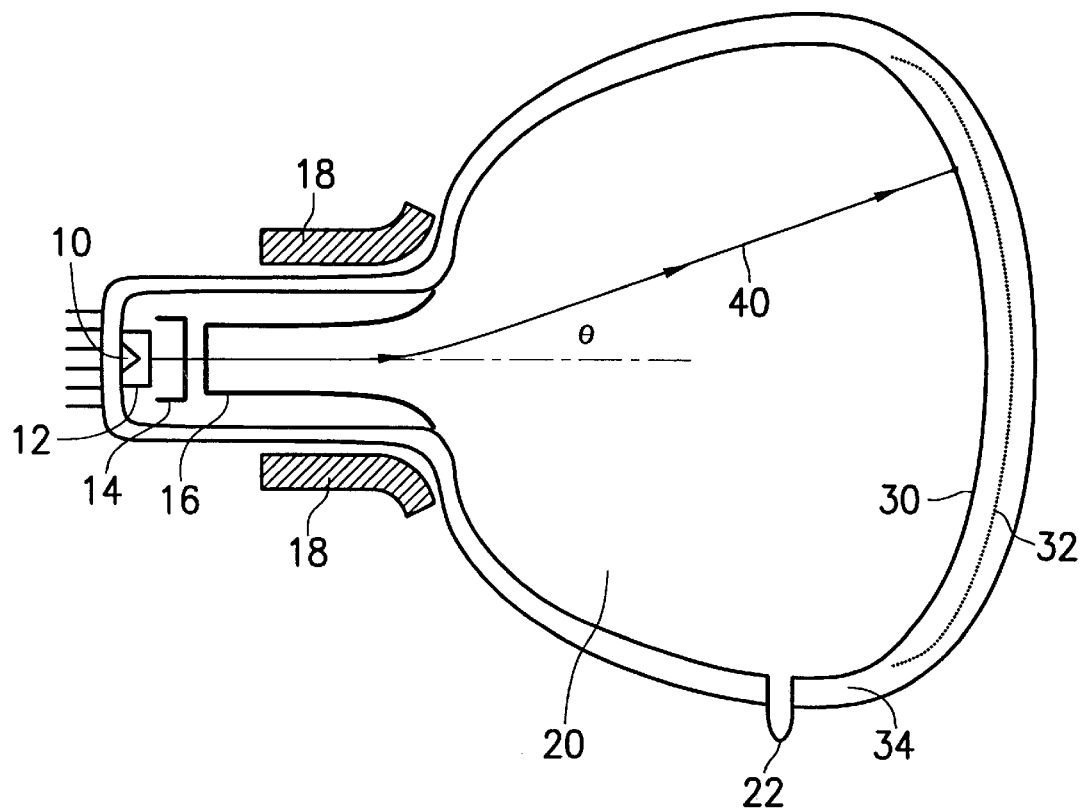
FIG. 1 (Prior Art) shows a cross-sectional view of the structure of a general CRT picture tube.
Figure 2:
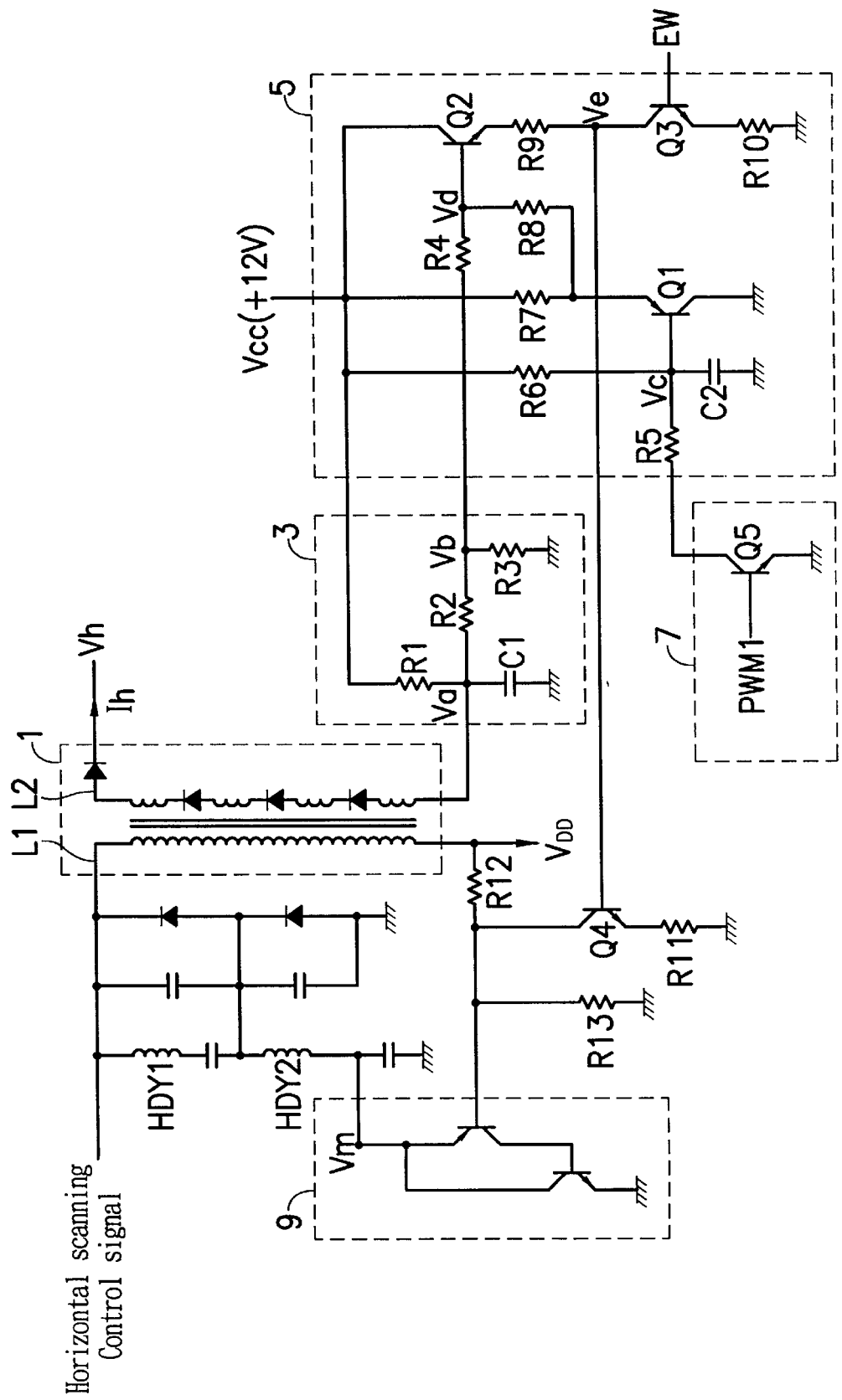
FIG. 2 shows the detailed circuit diagram of the compensation control circuit for the variation of the horizontal scanning size in the embodiment of the present invention.

FIG. 2 shows the detailed circuit diagram of the compensation control circuit for the variation of the horizontal scanning size in the embodiment of the present invention. The compensation control circuit of the preferred embodiment is mainly composed of the horizontal scanning size compensation circuit 3 and the horizontal scanning size control circuit 5. As to the other relative elements, such as fly-back transformer1, microprocessor 7, bipolar modulator 9, horizontal deflection yoke(HDY1, HDY2) and other elements, are together shown in FIG. 2 for convenience. The function and the axiom of each of the elements in FIG. 2 will be generally illustrated in turn as follows. Then the inner circuits of the horizontal scanning size compensation circuit 3 and horizontal scanning size control circuit 5 will be illustrated in detail.

The horizontal scanning control signal is generated by the horizontal synchronous scanning circuit(not shown in the figure). The original horizontal synchronous signal is in the form of pulse. The deflection current of the horizontal deflection yoke is in the form of sawtooth wave to control the electric beam to scan from left to right. As FIG. 2 shows, one terminal of the horizontal deflection yoke(HDY1, HDY2) is connected to horizontal scanning control signal and coupled to the primary winding L1 of the fly-back transformer1 simultaneously. The fly-back transformer1 provides the function of the boost. Therefore the needed anode voltage Vh and the anode load current Ih is generated in the coil of the secondary winding L2 of the fly-back transformer1. The anode voltage Vh will be sent to the corresponding anode electrode after it has been processed by the rectifier(not shown in the figure).

On the other hand, another terminal of the horizontal deflection yoke(HDY1, HDY2) is a modulation voltage Vm. In the embodiment, the modulation voltage Vm is composed of three signals. The first is the compensation voltage Vb generated by the horizontal scanning size compensation circuit 3. The second is the shift regulation voltage Vc generated by the microprocessor 7. The third is the A.C. modulation signal EW. The modulation voltage Vb is generated according to the variation of the anode voltage Vh, and its level is far lower than the anode voltage Vh. Suitable for the general electric circuit process. The shift regulation voltage Vc is applied to the microprocessor 7 of the general monitor for regulation. The actual value of the shift regulation voltage Vc depends on the ON or OFF states of the transistor Q5 controlled by the pulse modulation signal PWM1. The A.C. modulation signal EW is applied to compensate the geometric distortion of the horizontal scanning. For example, the pincushion distortion (located in the up and down sides of the horizontal scanning lines which is different from the middle portion horizontal scanning lines) can be compensated by the corresponding parabola wave.

The compensation voltage Vb, the shift regulation voltage Vc and the A.C. modulation signal EW merge in the horizontal scanning size control circuit 5 to generate a modulation reference voltage Ve, wherein the D.C. composition includes the compensation voltage Vb and the shift regulation voltage Vc. The modulation reference voltage Ve is sent to the bipolar modulator 9 after it has been processed by a amplifying circuit(includes the transistor Q4, the resistors R11, R12, R13) to generate the modulation voltage Vm. The variation relativity of the modulation reference voltage Ve, the modulation voltage Vm and the horizontal scanning size will briefly described as follows: When the amplitude of the modulation regulation voltage Ve increases, the amplitude of the modulation voltage Vm decreases, making the horizontal scanning size controlled by the horizontal deflection yoke(HDY1, HDY2) to increase. On the other hand, when the amplitude of the modulation reference voltage Ve decreases, the amplitude of the modulation voltage Vm increases, and the horizontal scanning size decreases.

The horizontal scanning size compensation circuit 3 and the horizontal scanning size control circuit 5 in FIG. 2 will be described in detail as follows. As FIG. 2 shows, the horizontal scanning size compensation circuit 3 includes the resistor R3, the capacitor C1 and the resistor R2 and R3. The resistor R1 is connected between the other terminal of the secondary winding of the fly-back transformer1 and a power supply voltage Vcc(+12V) to be a step-down resistor. The power supply voltage Vcc, resistor R1, the second winding L2 of the fly-back transformer1 and the anode voltage constitute the path of a high voltage current and set up a reference voltage Va on capacitor C1. When the anode load current increases, the corresponding anode high voltage decreases and the horizontal scanning size increases. Because the voltage drop due to the current through the resistor R1 increases, the reference voltage Va decreases synchronously. On the contrary, when the anode load current decreases, the corresponding anode high voltage increases and the horizontal scanning size decreases. Because the voltage drop due to the current through the resistor R1 decreases, the reference voltage Va increases synchronously. The capacitor C1 is connected between the secondary winding L2 and the ground to filter out the induced horizontal output pulse element. The resistor R2, R3 constitute a voltage divider circuit for dividing the reference voltage Va in a predetermined ratio into the compensation voltage Vb. Accordingly, the compensation voltage Vb changes synchronously with the variation of the anode load current for a suitable amount of the compensation.

In FIG. 2, the horizontal scanning size control circuit includes the transistors Q1, Q2, Q3, the capacitor C2 and the resistor R4-R10. The capacitor C2 and the resistors R5, R6 constitute a simple digital to analog converter. The power supply voltage Vcc goes through the route fromed by the resistors R6, R5, C2 and the transistor Q5 of the microprocessor 7 and sets up shift regulation voltage Vc on the capacitor C2. The control signal PWM1 controls the ON time of the transistor Q5 to determine the level of the shift regulation voltage Vc. The resistor R7 and the transistor Q1 constitute a high impedance buffer circuit(common emitter mode) to output the voltage Vc. And the compensation voltage Vb and the shift regulation voltage Vc is combined by the ratio of R4/R8 to be the D.C. modulation voltage Vd. The D.C. modulation voltage Vd goes through another high impedance buffer circuit formed by the transistor Q2 and the resistor R9 and adds the modulation reference voltage Ve. On the other hand, A.C. modulation signal EW goes through the amplifier circuit constituted by the transistor Q3 and resistor R10 and combined into the reference voltage Ve. To summarize, the function of the horizontal scanning size control circuit 5 is to combine the compensation voltage Vb, shift regulation voltage Vc of the D.C. element with the A.C. modulation signal EW of the A.C. element by a predetermined ratio to generate the modulation reference voltage Ve, which is sent to the bipolar modulation 9 to generate the modulation voltage Vm.

According to the description of the embodiment above, the variation relationship between the anode voltage Vh and the horizontal scanning size in the embodiment will be described as follows. Especially in the following illustration, it is assumed that the shift regulation voltage Vc generated by the microprocessor 7 and the A.C. modulation signal EW keep unchanged.

When the present anode load current is smaller than that in the normal situation, the anode voltage is higher than that in the normal situation. The influence of the actual horizontal scanning size decreases. Referring to FIG. 2, the voltage Va increases, then Vb, Vd, Ve also increase. As described above, the modulation reference voltage Ve of higher level causes the modulation voltage Vm to decrease. And the effect in the horizontal scanning size is increasing its size. Thus it compensates the decrease in horizontal scanning size due to the anode voltage. On the other hand, when the anode load current is higher than that in the normal situation, then the anode voltage is lower than that in the normal situation and the influence of the actual horizontal scanning size increases. Referring to FIG. 2, when the voltage Va decreases, then Vb, Vd, Ve also decrease. The modulation reference voltage Ve of lower level causes the modulation voltage Vm to increase. And the effect in horizontal scanning size is decreasing its size, thus it compensates the increase in actual horizontal scanning size.

To summarize, the compensation control circuit of the horizontal scanning size in the embodiment obtains the variation situation of the anode voltage Vh from the secondary winding L2 of the fly-back transformer, that is the another end of the terminal that outputs the anode voltage Vh. The function of the horizontal scanning size compensation circuit 3 is to attain the compensation voltage Vb. The compensation voltage Vb is on the contrary to the variation of the anode load current. That is, when the anode load current Ih decreases, the anode voltage Vh increases, and the compensation voltage Vb increases. When the anode load current Ih increases, the anode voltage Vh decreases, and the compensation voltage Vb decreases. Also the level of the compensation voltage is suitable for the general electric circuit to process. The compensation voltage Vb through the horizontal scanning size control circuit 5 combines with the shift regulation amount of the general monitor and the A.C. modulation signal EW. Then, it is sent to the bipolar modulator to generate the modulation voltage and compensate the horizontal scanning size in the opposite direction to achieve the object of the present invention.

Besides, the another feature of the embodiment is to compensate the horizontal scanning size by compensation voltage Vb through the mechanism of the general modulation voltage Vm. However, the practice is not intended to limit the invention. The compensation voltage Vb can regulate its level through a horizontal scanning size control circuit and be sent to the another end of the horizontal scanning size(HDY1, HDY2) to change the level of that end to achieve the same object of the imvention.

Altogether, the compensation control circuit of the horizontal scanning size in the present invention has the following advantages:

1. Because it does not need to adopt the way of the high voltage stabilizing, the capital can substantially decrease. The elements used in the embodiment are electrical elements of general specification(lower than 12V), thus the prices are far lower than that of the prior art.

2. The compensation voltage can easily combine with the amount of regulation and the A.C. modulation signal(for example, parabola wave) through the modulation voltage mechanism of the general monitor to correct the horizontal scanning size. Therefore it is easy in embodiment.

The foregoing description of preferred embodiments of the present invention has been provided for the purposes of illustration and description. It is not intended to be exhaustive or to limit the invention to the precise forms disclosed. Many modifications and variations will be apparent to practitioners skilled in the art. The embodiments were chosen and described to best explain the principles of the invention and its practical application, thereby enabling others skilled in the art to understand the invention to practice various other embodiments and make various modifications suited to the particular use contemplated. It is intended that the scope of the invention be defined by the following claims and their equivalents.

What is claimed is:

1. A compensation control circuit for compensating the variation of a horizontal scanning size due to an anode load current, the anode load current being generated by a secondary winding of a fly-back transformer in a monitor and outputted from a first terminal of the secondary winding, the horizontal scanning size being controlled by a horizontal deflection yoke with a first end connected to a horizontal scanning control signal, comprising:

a horizontal scanning size compensation circuit, coupled to a second terminal of the secondary winding, for generating a compensation signal in response to the variation of the anode load current, the voltage of the compensation signal being lower than the voltage level at the first terminal of the secondary winding;

a horizontal scanning size control circuit, coupled to the horizontal scanning size compensation circuit, for generating a modulation reference signal by combining the compensation signal and a parabolic A.C. modulation signal; and a modulation device, coupled to the horizontal scanning size control circuit, for generating a modulation voltage relative to the modulation reference signal and sending to a second end of the horizontal deflection yoke for compensating the variation of horizontal scanning size due to the effect of the anode load current.

2. The compensation control circuit as claimed in claim 1, further comprising:

a microprocessor output unit, coupled to the horizontal scanning size control circuit, for generating a shift regulation signal and sending it to the horizontal scanning size control circuit, wherein the horizontal scanning size control circuit combines the compensation signal, the shift regulation signal and the A.C. modulation signal.

3. The compensation control circuit as claimed in claim 2, wherein the microprocessor output unit comprising:

a microprocessor having a switch, wherein a pulse modulation control signal generated by the microprocessor controls the ON and OFF states of the switch; and a digital to analog converter circuit, coupled to the microprocessor, having a capacitor for charging and generating the shift regulation signal, wherein the switch coupled between the capacitor and ground for controlling the magnitude of the shift regulation signal according to the pulse modulation signal.

4. The compensation control circuit as claimed in claim 1, wherein the A.C. modulation signal is a parabola signal for regulating the geometric distortion of the monitor.

5. The compensation control circuit as claimed in claim 1, wherein the horizontal scanning size compensation circuit comprising:

a step-down resistor, coupled between the second terminal of the secondary winding and a power supply voltage, for changing the voltage of the second terminal of the secondary winding corresponding to the variation of the anode load current;

a filtering capacitor, coupled between the second terminal of the secondary winding and ground, for filtering out noise; and a voltage divider, coupled to the second terminal of the secondary winding, for lowering the voltage of the second terminal of the secondary winding to generate the compensation signal.

6. A compensation control circuit for compensating the variation of a horizontal scanning size due to an anode load current, the anode load current being generated by a secondary winding of a fly-back transformer and outputted from a first terminal of the secondary winding, the horizontal scanning size being controlled by a horizontal deflection yoke with an first end connected to a horizontal scanning control signal, comprising:

a horizontal scanning size compensation circuit, coupled to a second terminal of the secondary winding, for generating a compensation signal in response to the variation of the anode load current, the voltage of the compensation signal being lower than the voltage level at the first terminal of the secondary winding; and a horizontal scanning size control circuit, coupled between the horizontal scanning size compensation circuit and a second terminal of the horizontal deflection yoke, for generating a D.C. modulation signal and combining an A.C. modulation signal and the compensation signal and sending to the second terminal of the horizontal deflection yoke to compensate the variation amount of the horizontal scanning size due to the variation of the anode load current wherein the A.C. modulation signal is parabolic.

7. The compensation control circuit as claimed in claim 6, further comprising:

a microprocessor output unit, coupled to the horizontal scanning size control circuit, for generating a shift regulation signal and sending to the horizontal scanning size control circuit, wherein the horizontal scanning size control circuit combines the compensation signal and the shift regulation signal for generating the D.C. modulation signal.

8. The compensation control circuit as claimed in claim 7, wherein the microprocessor output unit comprising:

a microprocessor having a switch, wherein a pulse modulation control signal generated by the microprocessor controls the ON and OFF states of the switch; and a digital to analog converter circuit, coupled to the microprocessor having a capacitor, for charging and generating the shift regulation signal, wherein the switch is coupled between the capacitor and ground for controlling the magnitude of the shift regulation signal according to the pulse modulation signal.

9. The compensation control circuit as claimed in claim 6, wherein the horizontal scanning size compensation circuit comprising:

a step-down resistor, coupled between the second terminal of the secondary winding and a power supply voltage, for changing the voltage of the second terminal of the secondary winding corresponding to the variation of the anode load current;

a filtering capacitor, coupled between the second terminal of the secondary winding and ground, for filtering out noise; and a voltage divider, coupled to the second terminal of the secondary winding, for lowering the voltage of the second terminal of the secondary winding to generate the compensation signal.

10. A method for compensating variation of horizontal scanning size in a monitor due to an effect of an anode load current generated by a secondary winding of a fly-back transformer and outputted from a first terminal of the secondary winding, the horizontal scanning size is controlled by a horizontal deflection yoke and one terminal of the horizontal deflection yoke receives a horizontal scanning control signal, comprising:

obtaining the variation of the anode load current through a second terminal of the secondary winding and generating a compensation signal having a voltage level lower than a voltage level of the first terminal of the secondary winding;

adjusting the level of the compensation signal for generating a D.C. modulation signal;

coupling the D.C. modulation signal to a second terminal of the horizontal deflection yoke for compensating the variation amount of horizontal scanning size due to the effect of the anode load current; and combining the D.C. modulation signal with a parabolic A.C. modulation signal.

11. The compensation method as claimed in claim 10, further comprising:

generating a shift regulation signal by using a microprocessor coupled to the horizontal scanning size control circuit; and combining the compensation signal with the shift regulation signal.

12. The compensation method as claimed in claim 10, further comprising:

combining the D.C. modulation signal with an A.C. modulation signal, wherein the A.C. modulation signal is used for regulating the geometric distortion of the monitor display.

* * * * *